Aug. 20, 1957

P. E. WIBLE, JR 2,803,793

MOTOR SPEED CONTROL SYSTEM

Filed Oct. 29, 1954

IN SYNC

OUT OF SYNC

OUT OF SYNC

*INVENTOR.*
PAUL E. WIBLE, JR.
BY
ATTYS.

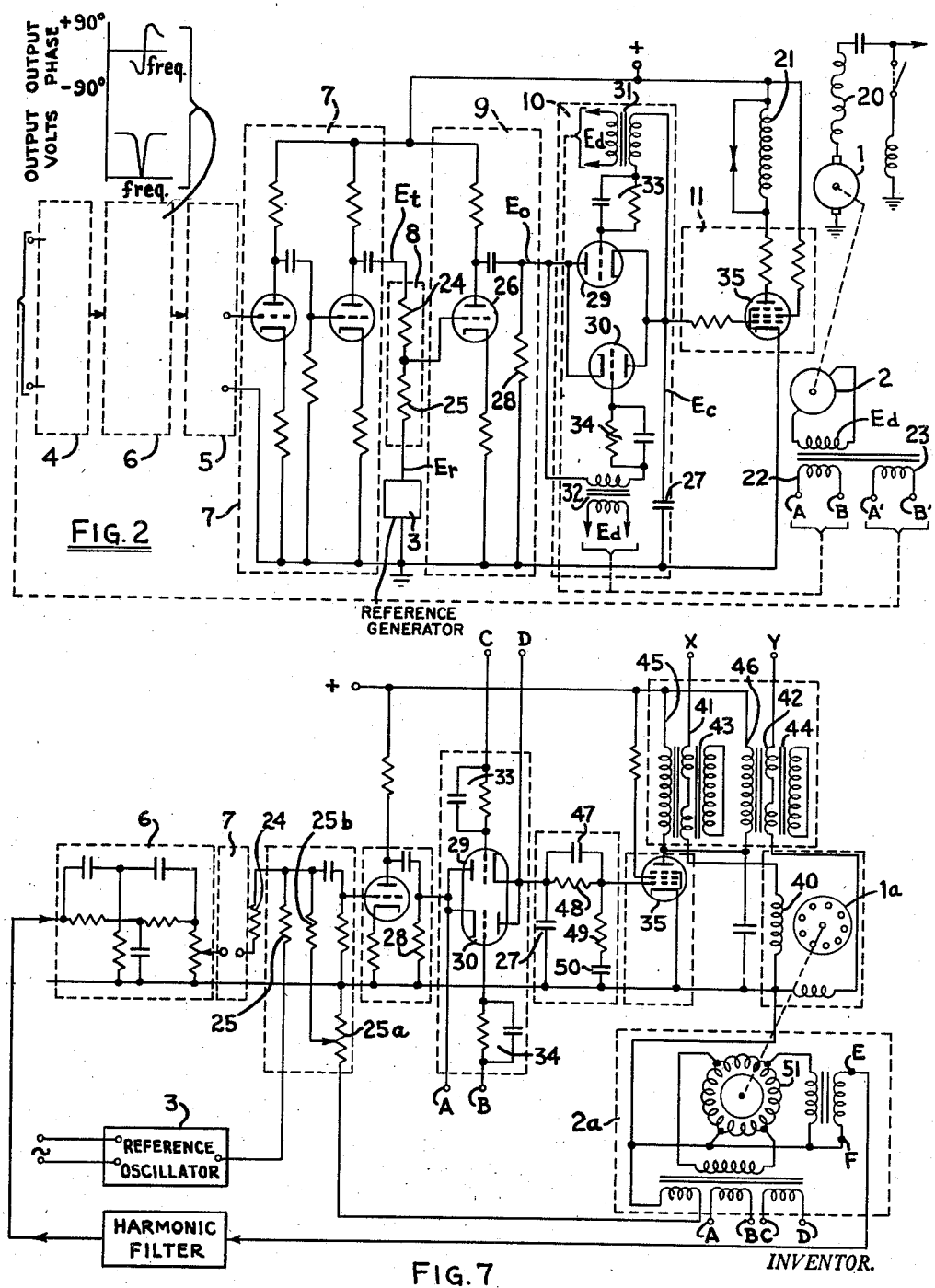

United States Patent Office 2,803,793
Patented Aug. 20, 1957

2,803,793

MOTOR SPEED CONTROL SYSTEM

Paul E. Wible, Jr., Dallas, Tex.

Application October 29, 1954, Serial No. 465,761

11 Claims. (Cl. 318—314)

(Granted under Title 35, U. S. Code (1952), sec. 266)

The invention described herein may be manufactured and used by or for the Government of the United States of America for governmental purposes without the payment of any royalties thereon or therefor.

This invention relates to motor follow-up systems and is particularly directed to speed controls for non-synchronous machines such as alternating current induction or direct current motors with a view to obtaining speeds dependent only on, and locked to, the undulatory wave of a reference frequency generator.

Heretofore, motor speed controls merely regulate the speed within finite minimum and maximum limits. The speed is usually sampled, as by an alternator or tachometer, and the move derived therefrom, is compared with the move from a reference generator do produce a difference or error signals which in turn, is used to appropriately change the average speed of the motor.

In Stoller, 2,395,517, for example, the reference and alternator frequencies are applied to a comparing circuit, called a phase detector, and a derived error signal is applied to the motor speed control circuits. The detector and its output circuit produce a motor control voltage which varies slowly compared to variations that can occur in the motor speed. That is, the inherent time constants of the resistance-capacitance networks of Stoller prevent instantaneous changes in the power delivered to the motor and thus prevent any action that resembles locking of the motor to the reference generator and true synchronous motor operation.

The object of this invention is a control system for a non-synchronous machine which will lock the machine in step with a reference wave and which will return the machine to an absolute synchronous speed if a sudden load should cause the machinist to slip one or more cycles of the reference wave.

The objects of this invention are attained by providing a control voltage representing the instantaneous change in the phase of a wave proportional to the motor speed relative to a reference wave and, for instantaneous changes in motor speed, applying power to the motor in distinct sharp-cornered steps, the power content of the steps or height of each step being proportionate to the phase of the two waves for each cycle of the reference wave. This pulse-like energy is supplemented by a steady direct current, the average value of which is proportional to the load and speed of the motor.

The principles and basic inventive concepts of this invention may be seen in the specific embodiments described hereinafter and shown in the accompanying drawing in which:

Figure 2 is a specific circuit diagram of the system shown in Figure 1,

Figure 6:
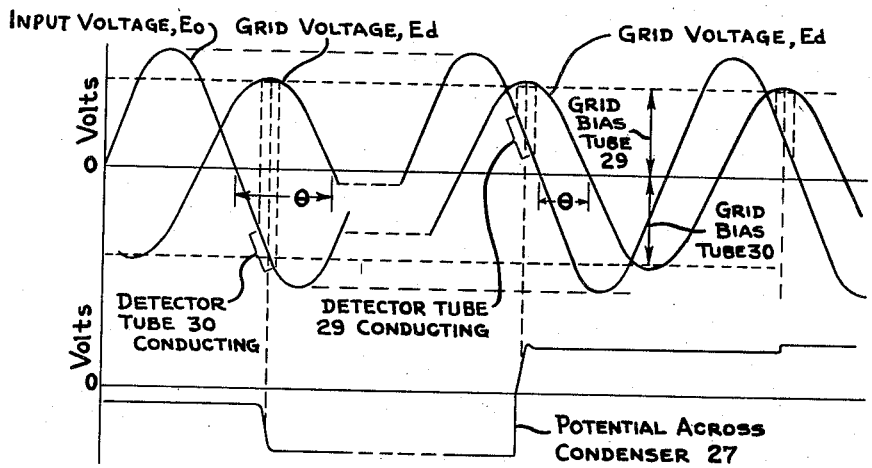
Figure 3:
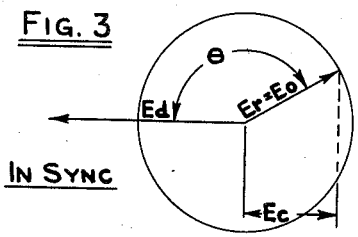
Figure 4:
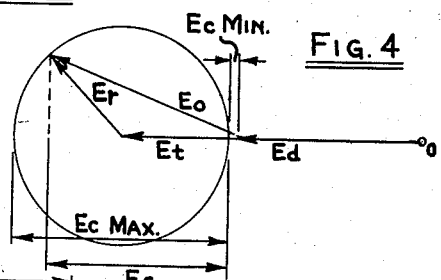
Figure 5:
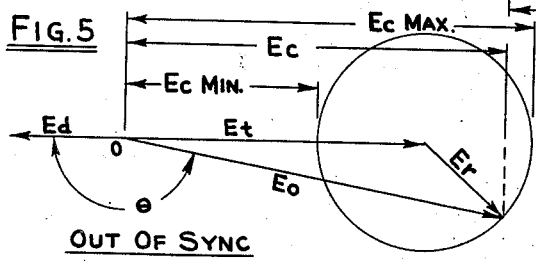

Figures 3, 4, and 5 are vector diagrams of important voltages of the circuits of Figure 2, Figure 6 shows the wave form of important voltages in the system, and Figure 7 shows an alternative system embodying this invention.

Figure 1:
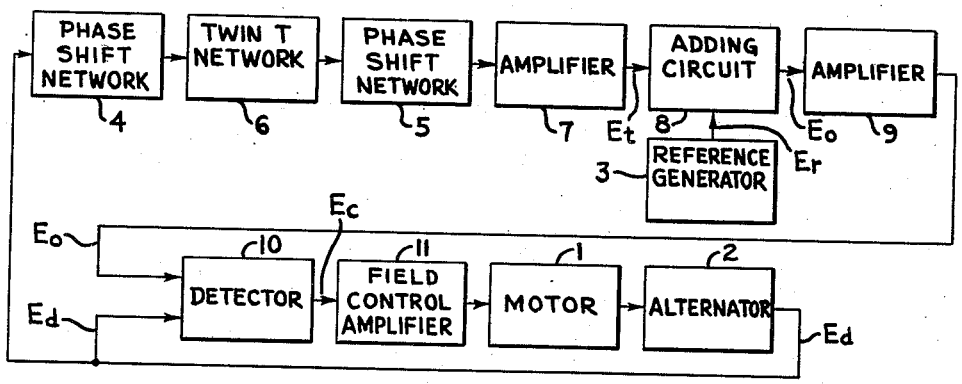
Figure 1 is a block diagram of the speed control system of this invention.

Referring to Figure 1, the motor 1 to be controlled is of the non-synchronous type and has a power input control unit 11. The power control may be of the type which controls current in the shunt or series field of the motor or which controls the armature current. For the purpose of sampling the speed of the motor it is convenient to mechanically drive the alternator or tachometer 2 which will generate an alternating wave, the frequency of which is proportional to the motor speed. The reference generator 3 produces an alternating wave related to, preferably equal to, the frequency of the alternator 2 at optimum speed of the motor. The detector 10 supplies power control unit 11 with information concerning:

(1) The phase relation of the wave of alternator 2 and the wave of the reference generator 3 and, (2) Information concerning the deviation of the average alternator speed from a predetermined optimum or null speed.

The particular alternator contemplated in this embodiment is of the single phase type producing an output signal which is fed not only to the detector 10 but to the narrow pass "twin-T" network 6. Phase shift networks 4 and 5 are coupled on either side of the narrow pass network 6. Network 6 offers substantially infinite attenuation to the alternator wave at said optimum frequency and relatively lower attenuation for frequencies above and below this optimum frequency. Network 6 also has the property of shifting the phase of the applied alternator wave of high or low frequency to a corresponding leading or lagging quadrature value. Because phase and frequency deviations occur concurrently, the network 6 effectively damps out phase oscillations. The twin-T network 6 may, if desired, be of the type described in Stoller, 2,395,515.

According to an important feature of this invention, the alternator wave in the twin-T network is further shifted 90 degrees. To statically shift the alternator wave an additional 90 degrees, the networks 4 and 5, of the bridge-T type, if desired, are serially connected with the twin-T network. Preferably one bridge-T network, capable of a 45 degree phase shift, is connected on either side of the twin-T network.

The output of the networks 4, 5, and 6 is amplified, if desired, at 7 and applied to an adding circuit 8. In the adding circuit, the output voltage of amplifier 7 is added to the output voltage of the reference generator 3. The adding circuit may be of a simple potentiometer type, and the sum of the voltage outputs of amplifier 7 and reference generator 3, amplified further at 9, is applied to the detector 10.

For convenience, the various voltages throughout the system of Figure 1 are labelled as follows: The output of the alternator is alternating voltage $E_d$ which is applied to the phase detector 10 as well as to the phase shifting network 4. The amplified output of the networks 4, 5, and 6 is called voltage $E_t$, while the output of the reference voltage generator is $E_r$. The sum voltage $E_o$ at the output of the adding circuit 8 is then equal to $E_t + E_r$. If $E_t$ is zero, then $E_o = E_r$. Finally, the corrective voltage applied to the motor control unit is $E_c$. While the motor control voltage $E_c$ may in practice be a fluctuating direct current voltage, its amplitude can properly be represented on an A. C. vector diagram, as explained below.

The operation of the system of Figure 1 may be briefly outlined by referring to the mentioned voltages, $E_d$, $E_t$, $E_r$, and $E_o$, in the vector diagrams of Figures 3, 4, and 5. Voltage $E_d$, though variable in time phase as the motor speed changes, is more conveniently drawn in the vector diagrams as the base line. Since $E_d$ is shifted 90 degrees in the networks 4 and 5, and since the twin-T further shifts $E_d$ an additional plus or minus 90 degrees, the output $E_t$ will either be in phase, as shown in Figure 4, or exactly out of phase, as shown in Figure 5. $E_r$, in either case, is added vectorially to the end of the $E_t$ vector and the vectorial sum $E_o$ is applied to detector 10 for comparison of the phase of $E_o$ with the phase of voltage $E_d$.

In case the alternator is synchronous with the reference generator, the infinite or near infinite attenuation of twin-T network 6 for that frequency reduces the $E_t$ voltage to or near zero. Then the vector diagram may be drawn as shown in Figure 3 where $E_t$ disappears and $E_r$ or its effective equivalent, is fed to the detector 10. The phase detector, as hereinafter fully described, applies a correcting voltage $E_c$ to the motor which voltage is proportional to the projection of $E_o$ on the $E_d$ axis. In case of loss of synchronism, $E_c$ may thus vary from a maximum magnitude in one direction to a maximum in the other direction referring to the vector diagrams of Figures 3, 4, and 5. For constant load and constant line voltage, the $E_r$ voltage maintains synchronism, with only stability effects from $E_t$, and only when there is a load or input variation sufficient to produce a speed change is $E_t$ required to correct speed.

Referring to the circuit diagram of Figure 2, the specific motor shown is of the direct current type with a series field winding 20 and a shunt winding 21. The shunt field current is regulated in this embodiment for motor speed regulation. Built into or coupled to the motor is the alternator 2 with a single phase winding at the terminals of which are obtained the alternating voltage $E_d$ proportional in frequency to the motor speed. The alternator may be of the tachometer type, designed merely to generate speed indicating voltages. The voltage $E_d$, as explained, is applied via transformer windings 22 and 23 both to the input of the network 4 and to the phase detector 10. The phase-shifting networks 4 and 5 are not claimed per se and need not be described in detail. There are numerous networks that will statically shift the phase of an applied wave, the requirement of this system being merely that about 90 degrees shift be effected. Likewise the twin-T attenuation network 6 is not claimed per se. Good results have been obtained with the resistance-capitance arms of the twin-T network substantially as shown in Stoller, supra, the circuit constants of which are so chosen that the attenuation of the network to the applied wave is maximum for the reference or optimum frequency of voltage $E_d$. Network 6 has the property, as mentioned, of abruptly shifting the applied wave of higher or lower frequencies, respectively, to a leading or lagging 90° quadrature value. Conventional amplifiers at 7 with conventional capacity couplings as shown are provided for increasing the amplitude of the phase-shifted voltage $E_t$ to the desired level.

The voltage adding circuit in Figure 2 comprises the resistor 24 in the output of amplifier 7 and the resistor 25 in the output of reference generator 3, the two resistors being connected in series and their common junction connected to the grid of amplifier 26. The input to implifier 26 now becomes directly proportional to the vector sum of the alternating voltages $E_t$ and $E_r$ across the two resistors 24 and 25. If the A. C. voltage output of amplifier 7 is zero, as it is when $E_d$ is at the optimum or null frequency, then the sole signal applied to the grid of tube 26 is directly proportional to the output $E_r$ of the reference generator. This reference generator output $E_r$, however, will be supplemented by an $E_t$ voltage either above or below the reference frequency when the alternator is running too fast or too slow. The output of amplifier 26, previously referred to as $E_o$, may equal or be proportional to $E_t+E_r$, but since $E_t$ may decrease to zero, $E_o$ becomes analogous to $E_r$ at the nul frequency, referring again to Figure 3.

The phase detector 10 includes the condenser 27 connected across the coupling resistor 28, across which appears the vectorially summed voltage $E_o$. In series between condenser 27 and resistor 28 are the anode-cathode spaces of the grid-controlled electron discharge tubes 29 and 30, the discharge spaces being in parallel but being oppositely polarized with respect to the condenser and its charging source 28. That is, space current in one tube, 29, will charge condenser 27 in one direction, and hence increase the potential across the condenser, while space current in the other tube, 30, will decrease the charge in and the potential across condenser 27. Triodes are shown, although tetrodes or pentodes could be used if desired. Furthermore, if grid controlled gas tubes are to be used in the detector it is necessary that the anode-cathode space present low impedance to the flow of current between the condenser and the voltage source, $E_o$, when the tubes are not blocked by a high grid bias. Where the coupling resistor 28 is about 270,000 ohms in the output of a commercial 12AU7 amplifier tube at 26, and where condenser 27 has a capacity of about .05 to .10 microfarad, good results were obtained with commercial 12AU7's for the detector tubes 29 and 30. With such tubes for alternately charging and discharging the condenser 27, the potential changes across the condenser were found to be in sharply defined steps, as seen in Figure 6.

In series with the grid-cathode circuits of the detector tubes 29 and 30 are connected, respectively, the secondary windings of the transformers 31 and 32, the primary windings of which are coupled in parallel to the output terminals A–B of the transformer winding 22. Also in series with the grid-cathode circuits are the grid leak resistor-condenser combinations 33 and 34 to negatively bias the grids. According to a preferred embodiment, the grid bias is well beyond cut-off so that only the peaks of the applied alternating waves can drive the grids to tube-conduction condition. Where the detector tubes 29 and 30 are of the commercial 12AU7 type and the voltages across secondary windings of transformers 31 and 32 are twenty root means square volts, a grid condenser of .001 microfarad and a grid leak resistance of 1 megohm was found to unblock the tubes only during a short interval of time at the peaks of the positive loops of the applied alternating wave.

The production of the sharp-cornered steps in the voltage across condenser 27 may be analyzed by considering the phase relations of the alternating waves applied to the detector tubes. As shown in Figure 6, the A.-C. grid voltage, $E_d$, may lag the voltage, $E_o$, by an amount $\theta$. Since the grid is biased beyond cut-off to such an extent that only peaks of the A. C. wave applied to the grid will drive the grid above cut-off, the plate-cathode circuit is conductive for but a relatively short period during each cycle. The amount of change in the charge on the condenser 27 will be a function of the duration of the conduction of the tube 29 or 30, as well as a function of the volume of current flow during the time of conduction. The voltage on either anode at the time the grid rises above cut-off will depend on the phase relation of the two waves. Thus, the potential left on condenser 27 may vary for each cycle of the wave. By inspection of Figure 6, it is seen that if the phase angle $\theta$ does not exceed 90°, as when it occurs between —90 and +90 degrees in the fourth and first quadrants respectively, tube 29 is conductive and the flow of its plate current causes condenser 27 to take on a negative charge. If, however, the phase angle $\theta$ exceeds 90°, as when it occurs between +90 and —90 degrees in the second and third quadrants, tube 30 becomes conductive and the condenser 27 takes on a positive charge.

The power control unit 11 in the embodiment shown comprises an amplifier tube connected in series with the speed-control shunt field of the motor. The current carrying capacity of the amplifier must of course be commensurate with the current requirements of the shunt or other winding employed to control the motor speed. The input terminals of the amplifier are connected directly across the condenser 27.

At the optimum speed of the motor, the current of the shunt winding and the space current of the control tubes and the grid voltage of the amplifier must stand at a predetermined average level. If now the space phase of the motor shaft momentarily lags, say, because of a change in load or change in line voltage, then the phase of the voltage $E_d$ applied to the grids of the detector tubes will momentarily lag a corresponding amount. That is, referring to Figure 6, the detector grid voltage wave, $E_d$, will shift to the left with respect to the detector input voltage, $E_o$, thus increasing the magnitude of the positive voltage on the detector plate of tube 29 at the time the grid unblocking potential is applied. Hence, the height of the step of the rectangular wave, Figure 6, increases. This momentary phase lag is immediately met with current of smaller amplitude in the field winding of the motor to increase the synchronizing power of the motor. The result is somewhat analogous to the increase in applied A. C. power to a synchronous motor when momentary load changes on the motor changes the reactance of the motor windings to keep the motor within the one-half of one cycle of synchronism. The synchronizing characteristics of the direct current circuits of the system of this invention may be exaggerated by increasing the current carrying capacity of the control tube 35, and by increasing the swing of the voltage across condenser 27 as by appropriate amplification of the phase detector output. It is important to note that the control voltage for the motor which is seen across condenser 27 is forceably changed to a new level when $\theta$ changes and that the response of the motor is not delayed by the decay time of any resistance-capacitance network.

The assumed condition above of increased load and momentary lag of the motor may be also seen in Figure 3 where the angle $\theta$ momentarily increases and the projection $E_c$ on the $E_d$ axis is increased. Synchronizing power is a function of both instantaneous frequency and phase angle. Minimum motor field current to produce maximum motor power output is attained when $\theta$ is 180 degrees. Maximum motor field current and minimum motor power is applied when $\theta$ is 90 degrees.

Assume next that the load on the motor or the line voltage change is so severe as to force $\theta$ beyond 180 degrees and the motor slips one or more cycles whereupon the detectable change in the alternator frequency at the input terminals of the twin-T network is sufficient to produce a finite voltage, $E_t$, at the amplified output of the network. Thereupon, the voltage $E_t$ is added to voltage $E_d$ as shown in Figures 4 and 5, the phase of these two being in or 180 degrees out of phase. Where the motor speed change is downward, say, and the amount of speed change is sufficient to effect a detectable change in the network impedance, the voltages $E_d$, $E_t$ and $E_r$ add vectorially as shown in Figure 4 to produce a resultant correcting voltage $E_o$, the projection of which on the base line is a measure of the total power applied to the motor to overcome the changed motor load conditions.

The shunt wound direct current motor of Figure 2 is controlled in speed by controlling the current through the shunt winding. This motor as expected requires a decrease in field current to effect an increase in line current and an increase in motor power. The motor control may, alternatively, be applied directly to a variable impedance device in the line where an induction motor is to be used. As shown in Figure 7, the induction motor 1a has stator windings 40 connected directly to an alternating power source XY through the windings 41 and 42 on saturable reactors, 43 and 44, which are conveniently and positively controlled by the primary windings 45 and 46 of the reactors connected in series with the power amplifier tube 35. The input to the power amplifier is connected across the condenser 27, as in Figure 2.

If the feedback characteristics of the motor follow-up system of this invention are such that hunting appears likely, anti-hunt circuits are conveniently applied. In Figure 7, for example, condenser 47 and resistor 48 are placed in series with the circuit between the condenser 27 and the amplifier, and in shunt therewith is connected the series resistor 49 and condenser 50, all of which statically adjust the phase of the voltage across condenser 27 to minimize hunting.

Many modifications may be made in this invention without departing from the scope of the appended claims. For example, the 90 degree phase shift provided by the bridge-T networks 4 and 5 of Figure 2 may instead be provided by the quadrature voltage windings 51 on the split phase alternator 2a. In Figure 7 the two 90 degree phase windings of the alternator are diagrammatically shown, one generating the $E_d$ voltage at terminals A—B and C—D for application to the detector grid, and the other winding generating the quadrature voltage at terminals E—F for application to the twin-T network 6. A harmonic filter is found to be desirable between the alternator and the input to the twin-T to remove objectionable harmonics usually found in the output of an alternator. Harmonics will pass the twin-T and saturate the amplifier stages following the filter. The vectorial additions of voltages in the circuitry of Figure 7 are substantially the same as in Figure 2. In Figure 7 a voltage in phase with $E_d$, and conveniently taken from a winding of the alternator having the $E_d$ phase, is applied across potentiometer 25a, an adjustable portion of which is added to the $E_t$, $E_r$ voltages of 24, 25. Such a feedback voltage reduces the required gain through the twin-T path, and also increases the phase angle between $E_r$ and $E_d$, over which synchronization may take place, from 90 to 180 degrees.

What is claimed is:

1. In an electric motor-speed control system including a first source of alternating reference signal of optimum frequency, a second source of alternating speed signal having a frequency representative of instantaneous motor speed, and a motor-speed control circuit, apparatus for producing substantially-instantaneously a control voltage for modulating the said motor-speed control circuit, the said apparatus comprising: first means coupled to the said second source effectually blocking the said speed signal at a frequency equal to the said optimum frequency, passing and displacing the phase of the said speed signal approximately one-hundred and eighty degrees at frequencies deviating in one direction from the said optimum frequency, and passing the said speed signal without phase displacement at frequencies deviating in the other direction from the said optimum frequency; second means coupled to the said first means and to the said first source for combining the said reference signal and any speed signal passed by the said first means to produce a resultant output signal; and third means having an output circuit coupled to the said motor-speed control circuit and first and second input circuits coupled respectively to the said second means and the said second source for producing substantially-instantaneously the said control voltage, the said control voltage having a polarity and amplitude representative of the instantaneous phase relationship between the said speed and optimum signals.

2. In an electric motor speed-control system, control-voltage producing apparatus as represented in claim 1 wherein the said third means comprises: two electron-discharge devices having space-current control grids coupled in parallel to form the said second input circuit, and cathodes and plates intercoupled such that the cathode of one of the said devices is coupled to the plate of the other said device to form the said first input circuit, and the plate of the said one device is coupled to the cathode of the said other device to form the said output circuit, thereby paralleling the cathode-to-plate paths of the said devices to pass space-current in opposite directions; and means for accumulating an electrical charge coupled between the said output circuit and a source of constant ground potential.

3. In an electric motor-speed control circuit, control voltage producing apparatus as represented in claim 2, wherein the said means for accumulating an electrical charge comprises a capacitor.

4. In an electric motor-speed control system including a first source of alternating reference signal of optimum frequency, a second source of alternating speed signal having a frequency representative of instantaneous motor speed, and a motor-speed control circuit, apparatus for producing substantially-instantaneously a control voltage for modulating the said motor-speed control circuit, the said apparatus comprising: first means coupled to the said second source effectually blocking the said speed signal at a frequency equal to the said optimum frequency, passing the said speed signal displaced in phase approximately one-hundred and eighty degrees at frequences deviating in one direction from the said optimum frequency, and passing the said speed signal without phase displacement at frequencies deviating in the other direction from the said optimum frequency; second means coupled to the said first means and to the said first source for combining vectorially the said reference signal and any speed signal passed by the said first means to produce a resultant output signal; an electrical charge storage element; and a pair of electron-discharge devices having control grids coupled to the said second source and cathode-to-plate electron paths coupled in parallel between the said second means and the said electrical charge storage element for producing the said control voltage.

5. A motor-speed control system comprising: an electric motor having a rotative element normally operative at an optimum speed; means generating an electric wave $E_d$ having a frequency proportional to the speed of the said rotative element, said $E_d$ having an optimum frequency when the said element is rotating at optimum speed; first means for effectively conducting and shifting the phase of $E_d$ only at frequencies differing from the said optimum frequency, the last-named means producing quadrature phase shifts approximating ninety electrical degrees in one of two possible directions, the said direction of phase shift depending upon the direction of deviation from optimum frequency and the amplitude depending upon the magnitude of frequency deviation; second means coupled to the said first means further shifting the phase of $E_d$ ninety electrical degrees in only one direction; means coupled to the said second means for increasing the amplitude of any portion of $E_d$ passed by the said first means, thereby producing an amplified wave $E_t$ and effectively increasing the sensitivity of the said speed control system to small frequency deviations of $E_d$; means for generating a reference signal $E_r$ having a frequency equal to the said optimum frequency; an adding circuit coupled to the said second means and the said $E_r$-generating means for vectorially combining $E_r$ and $E_t$ to produce a resultant output signal having an amplitude and phase dependent upon the amplitude of $E_t$ and the phase relationship between $E_t$ and $E_r$; third means for producing substantially-instantaneously a control voltage, the said third means having an output circuit including means for accumulating an electrical charge, and first and second input circuits coupled respectively to the said adding circuit and to the said $E_d$-generating means; and means responsive to the said control voltage for effecting changes in the speed of the said rotative element.

6. A motor-speed control system as represented in claim 5 wherein the said means for increasing the amplitude of $E_d$ comprises electric wave amplifiers having negligible signal time-delay characteristics.

7. A motor-speed control system as represented in claim 6 including means coupled between the said adding circuit and the said third means for amplifying $E_t$.

8. A motor-speed control circuit as represented in claim 5 wherein the said first means comprises a twin-T network.

9. A motor-speed control circuit is represented in claim 5 wherein the said second means comprises a first network coupled to the input of the said first means for shifting the phase of $E_d$ forty-five electrical degrees in one direction, and a second network coupled to the output of the said first means for shifting the phase of $E_d$ an additional forty-five degrees in the said one direction, such that the total phase shift of $E_d$ produced by the said second means is ninety electrical degrees.

10. A motor-speed control system is represented in claim 5 wherein the said third means further comprises: two electron discharge devices having space current control grids coupled in parallel to form the said second input circuit, and cathodes and plates intercoupled such that the cathode of each is coupled to the plate of the other of the said two devices, thereby forming the said first input and the said output circuits and paralleling the cathode-to-plate paths of the said devices to pass current in opposite directions.

11. A motor-speed control system as represented in claim 10 wherein the said charge accumulating means comprises a capacitor.

References Cited in the file of this patent

UNITED STATES PATENTS

| | | |
|---|---|---|
| 2,050,624 | Morton | Aug. 11, 1936 |
| 2,202,172 | Stoller | May 28, 1940 |
| 2,351,760 | Beers | June 20, 1944 |
| 2,389,692 | Sherwin | Nov. 27, 1945 |
| 2,395,517 | Stoller | Feb. 26, 1946 |
| 2,403,921 | Hallborg et al. | July 16, 1946 |
| 2,445,773 | Frost | July 27, 1948 |
| 2,471,916 | Volz | May 31, 1949 |
| 2,509,730 | Dome | May 30, 1950 |
| 2,521,058 | Goldberg | Sept. 5, 1950 |